United States Patent
Vo Hoang et al.

(10) Patent No.: US 11,702,223 B2
(45) Date of Patent: Jul. 18, 2023

(54) SYSTEM AND METHOD FOR ASSISTING WITH THE IDENTIFICATION OF VIBRATION ON BOARD AN AIRCRAFT

(71) Applicant: Airbus Operations SAS, Toulouse (FR)

(72) Inventors: Thien Phu Vo Hoang, Toulouse (FR); Pierrick Ollivier, Toulouse (FR)

(73) Assignee: Airbus Operations SAS, Louiouse (FR)

(*) Notice: Subject to any disclaimer, the term of this patent is extended or adjusted under 35 U.S.C. 154(b) by 229 days.

(21) Appl. No.: 17/201,676

(22) Filed: Mar. 15, 2021

(65) Prior Publication Data
US 2021/0292002 A1    Sep. 23, 2021

(30) Foreign Application Priority Data
Mar. 18, 2020    (FR) .................................. 2002634

(51) Int. Cl.
*B64D 45/00*    (2006.01)
*G07C 5/00*    (2006.01)
*G08G 5/00*    (2006.01)

(52) U.S. Cl.
CPC .............. *B64D 45/00* (2013.01); *G07C 5/008* (2013.01); *G08G 5/0021* (2013.01); *B64D 2045/0085* (2013.01)

(58) Field of Classification Search
CPC ............ B64D 45/00; B64D 2045/0085; G07C 5/008; G08G 5/0021; G01H 1/00; G01M 7/00; G05D 1/101
See application file for complete search history.

(56) References Cited

U.S. PATENT DOCUMENTS

| | | |
|---|---|---|
| 2008/0215194 A1 | 9/2008 | Bailly et al. |
| 2009/0273488 A1 | 11/2009 | Riser et al. |
| 2010/0010708 A1 | 1/2010 | Bailly et al. |
| 2018/0306666 A1 | 10/2018 | Coupard et al. |
| 2020/0388090 A1* | 12/2020 | Glatfelter ............... G07C 5/02 |

FOREIGN PATENT DOCUMENTS

| | | |
|---|---|---|
| CA | 2984522 A1 | 11/2016 |
| DE | 102006058903 A1 | 6/2008 |
| FR | 2933789 A1 | 1/2010 |

OTHER PUBLICATIONS

French Search Report; priority document.

* cited by examiner

*Primary Examiner* — James J Lee
*Assistant Examiner* — Shon G Foley
(74) *Attorney, Agent, or Firm* — Greer, Burns & Crain, Ltd.

(57) ABSTRACT

A system including a module for collecting vibration signals, a module for filtering the signals, a module for verifying whether the signals preserved by the filtering module correspond to signals representative of a set of flight conditions of the aircraft that are listed in a reference database, a module for identifying sources of vibration, a module for requesting a maneuver to be carried out by a pilot depending on the identified sources of vibration, a module for deciding, using a predefined decision tree, whether the preceding modules should be implemented again, and a module for transmitting a vibration report to a user device. The system allows assistance to be given, to the pilot, with the generation of a vibration report, and assistance to be given with maintenance of the aircraft.

14 Claims, 2 Drawing Sheets

SYSTEM AND METHOD FOR ASSISTING WITH THE IDENTIFICATION OF VIBRATION ON BOARD AN AIRCRAFT

CROSS-REFERENCES TO RELATED APPLICATIONS

This application claims the benefit of the French patent application No. 2002634 filed on Mar. 18, 2020, the entire disclosures of which are incorporated herein by way of reference.

FIELD OF THE INVENTION

The present invention relates to assisting with the identification of vibration on board an aircraft. In particular, it relates to a system and method for assisting with the identification of vibration on board an aircraft.

BACKGROUND OF THE INVENTION

An aircraft may generate vibrations that are sensed by people on board the aircraft, such as the pilot, aircrew or passengers. Depending on their origins, these vibrations are sensed as a physical movement or a noise, or both at the same time. This sensation may cause discomfort to the pilot and passengers and may require the aircraft to go AOG (Aircraft On Ground) during the process of maintenance and fault finding.

Currently, the method used to address these vibrations is iterative, subjective, and highly dependent on the senses of the pilot or aircrew. During the vibrations, the pilot and aircrew communicate their sensation of the vibrations using a vibration reporting sheet indicating the configuration of the aircraft and the main flight parameters on appearance of the vibrations, and the location of the vibrations and their severity. This sheet contains a decision tree comprising a plurality of steps to follow in order to attempt to identify the root causes of these vibrations. Maneuvers must be carried out by the pilot in order to isolate the causes of the vibrations. After the flight, particularly when the root causes have not been completely identified, the maintenance crew uses the vibration report from the sheet to complete a scorecard of root causes in order to identify other possible root causes. A first maintenance operation is then carried out assuming that the root cause of the vibrations corresponds to that having the highest score. If the vibrations have not disappeared after the first maintenance operation, a second maintenance operation is carried out assuming that the root cause of the vibrations corresponds to that having the second highest score. These operations are therefore complicated, resource-intensive and time-consuming.

Document DE 10 2006 058 903 attempts to prevent vibrations using a static measuring device to automate the measurement of play in ball joints of actuators. However, it requires measuring devices to be installed in proximity to the play and allows causes of vibration to be identified only in actuators. The solution proposed by this document is therefore not entirely satisfactory.

SUMMARY OF THE INVENTION

An aim of the present invention is to mitigate these drawbacks by providing a system and method for assisting with the identification of vibration on board an aircraft.

To this end, the present invention relates to assisting with the identification of vibration on board an aircraft.

According to the invention, the method comprises the following group of steps:
- a collecting step, implemented by a collecting module, comprising collecting at least one vibration-representative signal, the one or more signals being measured by at least one sensor on board the aircraft;
- a filtering step, implemented by a filtering module, comprising filtering the one or more vibration-representative signals with a view to preserving the signal that exhibits, or a set of signals that each exhibit, a vibration signature listed in a reference database;
- a verifying step, implemented by a verifying module, comprising verifying whether the signal or set of signals preserved in the filtering step corresponds to a signal or set of signals among signals or sets of signals listed in the reference database, each of the signals or sets of signals listed in the reference database being representative of a set of flight conditions of the aircraft;
- a step, implemented by an identifying module, of identifying whether the signal or set of signals does not correspond to a signal or set of signals among signals or sets of signals listed in the reference database, comprising identifying one or more sources of vibration corresponding to the signal or set of signals;
- a maneuver-requesting step, implemented by a maneuver-requesting module, comprising requesting an operator to carry out at least one maneuver with the aircraft, the one or more requested maneuvers depending on the one or more identified sources of vibration;

the method furthermore comprising:
- a deciding step, implemented by a deciding module, comprising deciding, using a predefined decision tree, whether the group of steps should be implemented again;
- a transmitting step, implemented by a transmitting module, comprising transmitting, to a user device, a report representative at least of the one or more identified sources and of the one or more maneuvers carried out by the operator.

Thus, by virtue of the method, the pilot is assisted with the generation of a vibration report that will allow the time and resources necessary for maintenance operations on the aircraft to be decreased.

In addition, the filtering step comprises the following substeps for the sensor or each of the sensors:
- a first filtering substep, implemented by a first filtering submodule, comprising filtering the one or more signals measured by the sensor or sensors so as to remove components of the one or more signals corresponding to vibrations having a vibration frequency outside a frequency band characteristic of one or more portions of the aircraft in which the one or more sensors are located;
- a second filtering substep, implemented by a second filtering submodule, comprising filtering the one or more signals filtered in the first filtering substep so as to preserve components of the one or more signals corresponding to vibrations having a vibration amplitude greater than an amplitude threshold characteristic of the one or more portions in which the one or more sensors are located, the vibrations having an amplitude greater than the characteristic amplitude threshold for a time longer than a characteristic time of the one or more portions in which the one or more sensors are located.

Furthermore, the second filtering substep comprises the following substeps:

- an envelope-determining substep, implemented by an envelope-determining submodule, comprising determining an envelope for the or for each of the signals filtered in the first filtering sub step,
- a detecting substep, implemented by a detecting submodule, comprising detecting one or more peaks of the envelope or of each of the envelopes having an amplitude greater than the characteristic amplitude threshold for a time longer than a characteristic time of the one or more portions in which the one or more sensors are located;

the components of the one or more preserved signals corresponding to vibrations comprised in one or more peaks of the envelope or of each of the envelopes detected in the detecting substep.

Advantageously, the method comprises an inputting step, implemented by an inputting module, comprising inputting current flight parameters and current flight conditions, the verifying step furthermore comprising verifying whether the signal or set of signals preserved in the filtering step corresponds to a signal or set of signals characteristic of a current flight phase on the basis of the current flight parameters and the current flight conditions, the identifying step and the maneuver-requesting step being implemented furthermore if the signal or set of signals preserved in the filtering step does not correspond to a signal or set of signals characteristic of a current flight phase.

According to one particularity, the inputting step comprises a collecting substep, implemented by a collecting submodule, comprising collecting, via an input keyboard, at least some of the current flight parameters and flight conditions.

According to another particularity, the inputting step comprises a capturing substep, implemented by a capturing module, comprising capturing at least one voice sequence produced by an operator, the voice sequence corresponding to at least some of the flight parameters and current flight conditions.

Optionally, the user device corresponds to a data lake.

The invention also relates to a system for assisting with the identification of vibration on board an aircraft.

According to the invention, the system comprises the following group of modules:

- a collecting module configured to collect at least one vibration-representative signal, the one or more signals being measured by at least one sensor on board the aircraft;
- a filtering module configured to filter the one or more vibration-representative signals with a view to preserving the signal that exhibits, or a set of signals that each exhibit, a vibration signature listed in a reference database;
- a verifying module configured to verify whether the signal or set of signals preserved by the filtering module corresponds to a signal or set of signals among signals or sets of signals listed in the reference database, each of the signals or sets of signals listed in the reference database being representative of a set of flight conditions of the aircraft;
- an identifying module configured to identify one or more sources of vibration corresponding to the signal or set of signals, on the basis of the reference database, if the signal or set of signals does not correspond to a signal or set of signals among signals or sets of signals listed in the reference database;
- a maneuver-requesting module configured to request an operator to carry out at least one maneuver with the aircraft, the one or more requested maneuvers depending on the one or more identified sources of vibration;

the system furthermore comprising:

- a deciding module configured to decide, using a predefined decision tree, whether the group of modules should be implemented again;
- a transmitting module configured to transmit, to a user device, a report representative at least of the one or more identified sources and of the one or more maneuvers carried out by the operator.

In addition, the filtering module comprises:

- a first filtering submodule configured to filter the one or more signals measured by the sensor or sensors so as to remove components of the one or more signals corresponding to vibrations having a vibration frequency outside a frequency band characteristic of one or more portions of the aircraft in which the one or more sensors are located;
- a second filtering submodule configured to filter the one or more signals filtered by the first filtering submodule so as to preserve components of the one or more signals corresponding to vibrations having a vibration amplitude greater than an amplitude threshold characteristic of the one or more portions in which the one or more sensors are located, the vibrations having an amplitude greater than the characteristic amplitude threshold for a time longer than a characteristic time of the one or more portions in which the one or more sensors are located.

Furthermore, the second filtering submodule comprises:

- an envelope-determining submodule configured to determine an envelope for the or for each of the signals filtered by the first filtering submodule,
- a detecting submodule configured to detect one or more peaks of the envelope or of each of the envelopes having an amplitude greater than the characteristic amplitude threshold for a time longer than a characteristic time of the one or more portions in which the one or more sensors are located, the components of the one or more preserved signals corresponding to vibrations comprised in one or more peaks of the envelope or of each of the envelopes detected by the detecting submodule.

Advantageously, the system comprises an inputting module configured to input current flight parameters and current flight conditions, the verifying module furthermore being configured to verify whether the signal or set of signals preserved by the filtering module corresponds to a signal or set of signals characteristic of a current flight phase on the basis of the current flight parameters and the current flight conditions, the identifying module and the maneuver-requesting module being implemented furthermore if the signal or set of signals preserved by the filtering module does not correspond to a signal or set of signals characteristic of a current flight phase.

According to one particularity, the inputting module comprises a collecting submodule configured to collect, via an input keyboard, at least some of the current flight parameters and flight conditions.

According to another particularity, the inputting module comprises a capturing module configured to capture at least one voice sequence produced by an operator, the voice sequence corresponding to at least some of the flight parameters and current flight conditions.

The invention also relates to an aircraft, especially a transportation aircraft, characterized in that it comprises a system, such as described above, for assisting with the identification of vibration.

BRIEF DESCRIPTION OF THE DRAWINGS

The invention, with its features and advantages, will become more clearly apparent upon reading the description provided with reference to the appended drawings, in which.

DETAILED DESCRIPTION OF THE PREFERRED EMBODIMENTS

Figure 1:
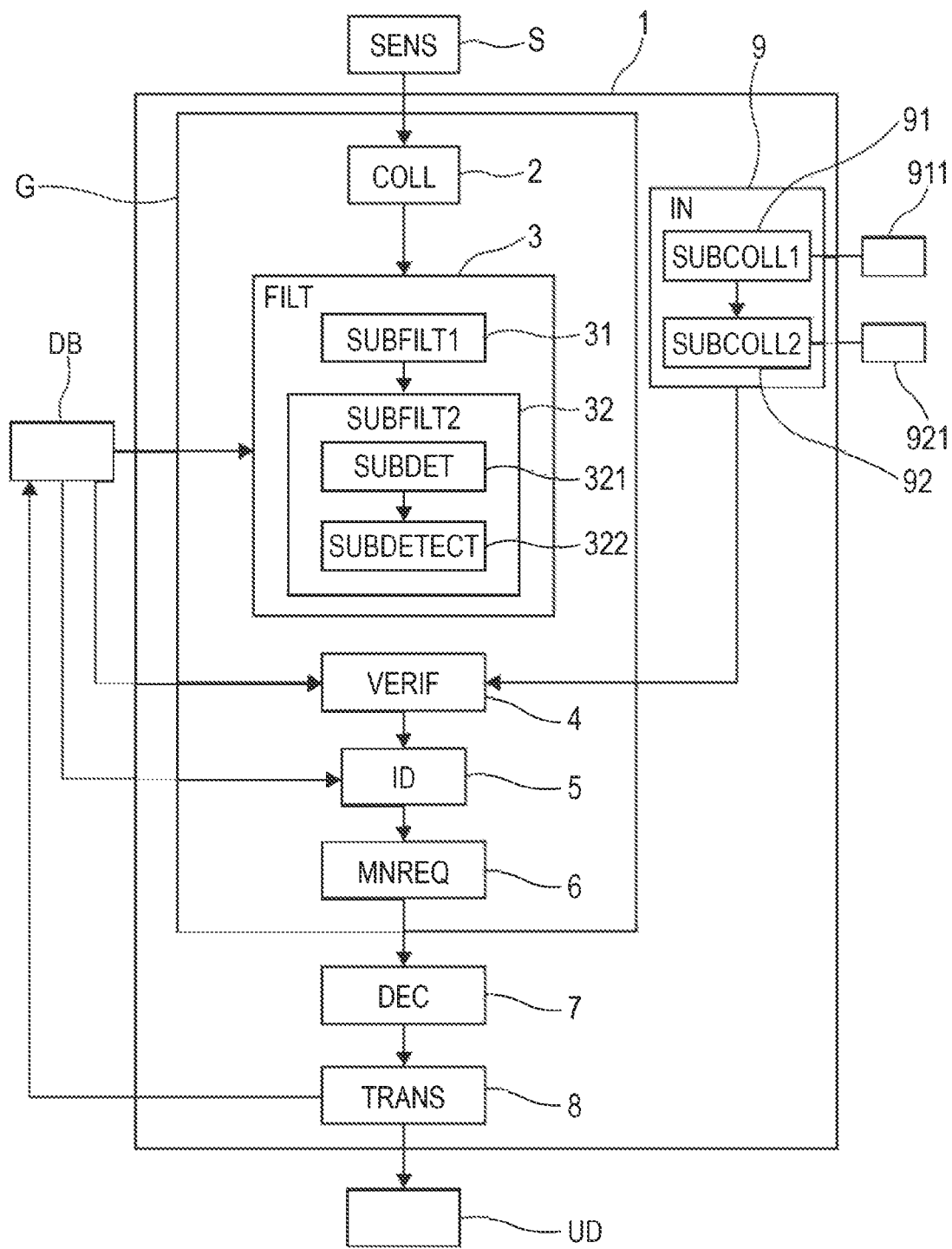
FIG. 1 schematically shows one embodiment of the system for assisting with the identification of vibration on board an aircraft, FIG. 2 schematically shows one embodiment of the method for assisting with the identification of vibration.

FIG. 1 shows one embodiment of a system 1 for identifying and flagging vibration on board an aircraft AC. In the rest of the description, the "system 1 for identifying and flagging vibration on board an aircraft" is called "system 1".

Figure 3:
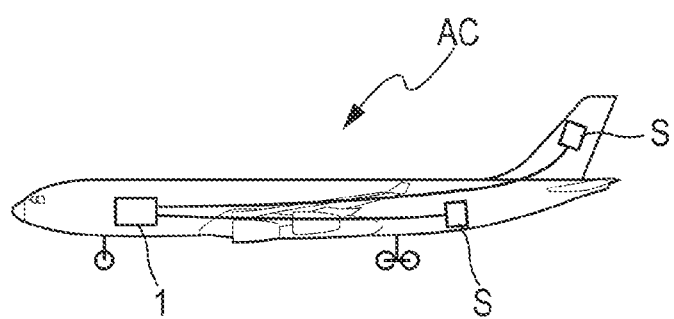
FIG. 3 shows a profile view of an aircraft incorporating the system.

The system 1, which is configured to be installed on board an aircraft AC (FIG. 3), may be triggered by the pilot of the aircraft AC at any moment during the flight. For example, it may be triggered on request by the pilot when vibrations are perceived by the pilot, or it may remain active throughout the flight in order to continuously and automatically monitor for vibrations.

The vibrations may correspond to a vibrational physical movement or to a noise, or to both at the same time.

The system 1 comprises the following group G of modules:
 a collecting module COLL, 2;
 a filtering module FILT, 3;
 a verifying module VERIF, 4;
 an identifying module ID, 5; and
 a maneuver-requesting module MNREQ, 6.

The collecting module 2 is configured to collect at least one vibration-representative signal. The one or more signals are measured by at least one sensor SENS, S on board the aircraft AC.

The one or more sensors S may be sensors installed on board or already integrated into the aircraft AC. The one or more sensors S may comprise an inertial reference system (IRS).

In a so-called connected aircraft, additional sensors S may be placed in specific regions of the aircraft AC. These regions may be chosen to specifically monitor for known potential vibrations. These additional sensors S may transmit the one or more signals using a wireless communication protocol such as Wi-Fi. These additional sensors S may specify the regions of the aircraft AC that are affected by the vibrations, and the components of the aircraft AC that are affected by the vibrations.

The filtering module 3 is configured to filter the one or more vibration-representative signals with a view to preserving the signal that exhibits, or a set of signals that each exhibit, a vibration signature listed in a reference database DB.

The signature of a signal corresponds to specific characteristics of a signal. These specific characteristics may relate to conditions on the frequency of the signal, its amplitude, etc.

Advantageously, the filtering module 3 comprises a filtering submodule SUBFILT1, 31 configured to filter the one or more signals measured by the sensor or sensors S. The filtering removes components of the one or more signals corresponding to vibrations having a vibration frequency outside a frequency band characteristic of one or more portions of the aircraft AC in which the one or more sensors S are located. Thus, the vibration components, the frequency of which is not comprised in the characteristic vibration band, are removed. The filtering module may also comprise a filtering submodule SUBFILT2, 32 configured to filter the one or more signals filtered by the filtering submodule 31. This filtering preserves components of the one or more signals corresponding to vibrations having a vibration amplitude greater than an amplitude threshold characteristic of the one or more portions in which the one or more sensors S are located. The vibrations must have an amplitude greater than the characteristic amplitude threshold for a time longer than a characteristic time of the one or more portions of the aircraft AC in which the one or more sensors S are located.

Moreover, the filtering submodule 32 may comprise an envelope-determining submodule SUBDET, 321 configured to determine an envelope for the or for each of the signals filtered by the filtering submodule 31 and a detecting submodule SUBDETECT, 322 configured to detect one or more peaks of the envelope or of each of the envelopes having an amplitude greater than the characteristic amplitude threshold for a time longer than a characteristic time of the one or more portions of the aircraft AC in which the one or more sensors S are located. The components of the one or more preserved signals correspond to the vibrations comprised in one or more peaks of the envelope or of each of the envelopes detected by the detecting submodule 322.

The verifying module 4 is configured to verify whether the signal or set of signals preserved by the filtering module 3 corresponds to a signal or set of signals among signals or sets of signals listed in the reference database DB.

Each of the signals or sets of signals listed in the reference database DB is representative of a set of flight conditions of the aircraft AC.

The reference database DB may be constructed or parameterized on the basis of theoretical properties of the various portions of the aircraft AC and/or on the basis of test-flight experiments.

The identifying module 5 is configured to identify one or more sources of vibration corresponding to the signal or set of signals preserved by the filtering module 3, on the basis of the reference database DB. This identifying module 5 is implemented if the signal or set of signals preserved by the filtering module 3 does not correspond to a signal or set of signals representative of a set of flight conditions of the aircraft among signals or sets of signals listed in the reference database DB.

The maneuver-requesting module 6 is configured to request an operator, in particular the pilot of the aircraft AC, to carry out at least one maneuver with the aircraft AC. The operator is requested to carry out the one or more maneuvers. These one or more maneuvers depend on the one or more sources of vibration identified by the identifying module 5. Thus, for example, when a set of signals is identified, a request is made, to the operator, for one or more maneuvers associated with this set, so that he or she may carry them out. These one or more maneuvers may allow the identification of the one or more sources of vibration to be confirmed. For example, a maneuver may correspond to actuation of a control surface of the aircraft AC.

The system 1 furthermore comprises a deciding module DEC, 7 configured to decide, using a predefined decision tree, whether the group G of modules should be implemented again.

The predefined decision tree contains a plurality of steps to be followed in order to attempt to identify the root causes of the vibrations. The one or more maneuvers described in the decision tree are carried out by the operator in order to isolate the causes of the vibrations. Depending on the result of the one or more maneuvers, the decision tree decides, i.e., starting from a root node of the decision tree and ending with an end node of the decision tree, whether the group G of modules need or need not be implemented again.

The system 1 may thus automatically detect whether a vibration is affected by a maneuver of the operator.

A report representative at least of the one or more identified sources and of the one or more maneuvers carried out by the operator is then generated on the basis at least of the one or more identified sources and of the one or more maneuvers carried out.

The system 1 furthermore comprises a transmitting module TRANS, 8 configured to transmit, to a user device UD, the report representative at least of the one or more identified sources and of the one or more maneuvers carried out by the operator. This report may be used by ground crew to assist them in the identification, then elimination of the root causes of the vibrations. The user device UD may correspond to a data lake. The user device UD may also correspond to a memory module located on board the aircraft AC.

The on-board memory may correspond to the reference database DB. In this case, the report generated by the system 1 may be used subsequently by the system 1 in a subsequent implementation of the system 1. By way of example, the report may be used in the filtering step E2, the verifying step E3 and/or the identifying step E4.

According to a first embodiment, the system 1 furthermore comprises an inputting module IN, 9 configured to input current flight parameters and current flight conditions. The verifying module 4 is then furthermore configured to verify whether the signal or set of signals preserved by the filtering module 3 corresponds to a signal or set of signals characteristic of a current flight phase on the basis of the current flight parameters and the current flight conditions. The identifying module 5 and the maneuver-requesting module 6 are implemented furthermore if the signal or set of signals preserved by the filtering module 3 does not correspond to a signal or set of signals characteristic of a current flight phase.

The inputting module 9 may comprise a collecting submodule SUBCOLL1, 91 configured to collect, via a physical or virtual input keyboard 911, at least some of the current flight parameters and flight conditions. For example, the input keyboard 911 corresponds to a virtual keyboard displayed on a tablet.

The inputting module 9 may also comprise a capturing module SUBCOLL2, 92 configured to capture, via a microphone element 921, at least one voice sequence produced by the operator. The voice sequence corresponds to at least some of the flight parameters and current flight conditions. The capturing module 92 may comprise a microphone and a voice-processing device. The voice-processing device allows the voice sequence produced by the operator to be converted into signals that are interpretable by the system 1.

According to a second embodiment, some of the flight parameters and current flight conditions may be transmitted to the system 1 by a piece of data-collecting equipment, such as a FOMAX (Flight Operations and Maintenance eXchanger). These data may be transmitted using a wireless communication protocol, such as the Wi-Fi protocol.

Figure 2:
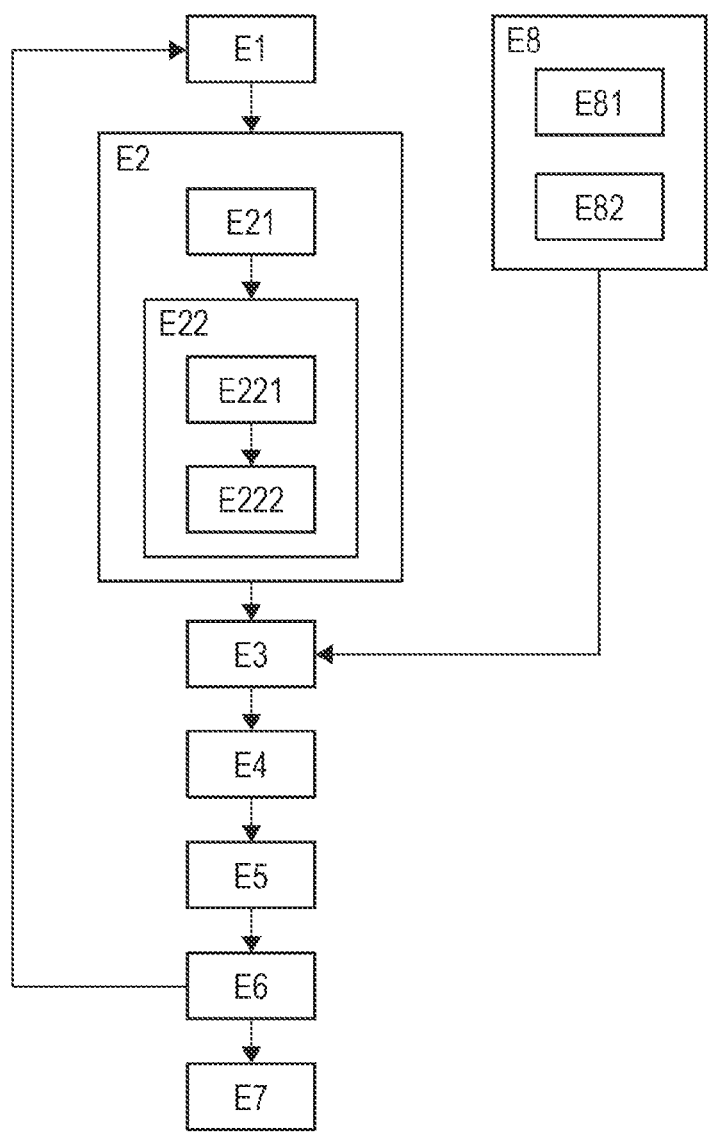

One embodiment of the method for assisting with the identification of vibration on board an aircraft is shown in FIG. 2.

The method comprises the following group of steps:
- a collecting step E1, implemented by the collecting module 2, comprising collecting at least one vibration-representative signal, the one or more signals being measured by at least one sensor S on board the aircraft AC;
- a filtering step E2, implemented by the filtering module 3, comprising filtering the one or more vibration-representative signals with a view to preserving the signal that exhibits, or a set of signals that each exhibit, a vibration signature listed in a reference database DB;
- a verifying step E3, implemented by the verifying module 4, comprising verifying whether the signal or set of signals preserved in the filtering step E2 corresponds to a signal or set of signals among signals or sets of signals listed in the reference database DB, each of the signals or sets of signals listed in the reference database DB being representative of a set of flight conditions of the aircraft AC;
- a step E4, implemented by the identifying module 5, of identifying whether the signal or set of signals preserved in the filtering step E2 does not correspond to a signal or set of signals representative of a set of flight conditions of the aircraft among the signals or the sets of signals listed in the reference database DB, comprising identifying one or more sources of vibration corresponding to the signal or set of signals preserved in the filtering step E2;
- a maneuver-requesting step E5, implemented by the maneuver-requesting module 6, comprising requesting an operator to carry out at least one maneuver with the aircraft AC, the one or more requested maneuvers depending on the one or more identified sources of vibration.

The method furthermore comprises:
- a deciding step E6, implemented by the deciding module 7, comprising deciding, using a predefined decision tree, whether the group of steps should be implemented again;
- a transmitting step E7, implemented by the transmitting module 8, comprising transmitting, to a user device UD, a report representative at least of the one or more identified sources and of the one or more maneuvers carried out by the operator.

The filtering step E2 may comprise the following substeps for the sensor or each of the sensors S:
- a filtering substep E21, implemented by the filtering submodule 31, comprising filtering the one or more signals measured by the sensor or sensors S so as to remove components of the one or more signals corresponding to vibrations having a vibration frequency outside a frequency band characteristic of one or more portions of the aircraft AC in which the one or more sensors S are located;
- a filtering substep E22, implemented by the filtering submodule 32, comprising filtering the one or more signals filtered in the filtering substep E21 so as to preserve components of the one or more signals corresponding to vibrations having a vibration amplitude greater than an amplitude threshold characteristic of the one or more portions in which the one or more sensors S are located, the vibrations having an amplitude greater than the characteristic amplitude threshold for a time longer than a characteristic time of the one or more portions in which the one or more sensors S are located.

The filtering substep E22 comprises the following substeps:
an envelope-determining substep E221, implemented by the envelope-determining submodule 321, comprising determining an envelope for the or for each of the signals filtered in the filtering substep E21,
a detecting substep E222, implemented by the detecting submodule 322, comprising detecting one or more peaks of the envelope or of each of the envelopes having an amplitude greater than the characteristic amplitude threshold for a time longer than a characteristic time of the one or more portions in which the one or more sensors S are located.

The components of the one or more preserved signals correspond to vibrations comprised in one or more peaks of the envelope or of each of the envelopes detected in the detecting substep E222.

The method may comprise an inputting step E8, implemented by the inputting module 9, comprising inputting current flight parameters and current flight conditions. Then, the verifying step E3 furthermore comprises verifying whether the signal or set of signals preserved in the filtering step E2 corresponds to a signal or set of signals characteristic of a current flight phase on the basis of the current flight parameters and the current flight conditions. The identifying step E4 and the maneuver-requesting step E5 are implemented furthermore if the signal or set of signals preserved in the filtering step E2 does not correspond to a signal or set of signals characteristic of a current flight phase.

The inputting step E8 may comprise a collecting substep E81, implemented by the collecting submodule 91, comprising collecting, via an input keyboard, at least some of the current flight parameters and flight conditions.

The inputting step E8 may comprise a capturing substep E82, implemented by the capturing module 92, comprising capturing at least one voice sequence produced by an operator, the voice sequence corresponding to at least some of the flight parameters and current flight conditions.

The systems and devices described herein may include a controller or a computing device comprising a processing unit and a memory which has stored therein computer-executable instructions for implementing the processes or steps described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for detecting vibration in an aircraft described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, or more simply, modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting with the identification of vibration on board an aircraft comprising the following group of steps:
a collecting step, implemented by a collecting module, comprising collecting at least one vibration-representative signal, the at least one signal being measured by at least one sensor on board the aircraft;
a filtering step, implemented by a filtering module, comprising filtering the at least one vibration-representative signal with a view to preserving at least one signal that exhibits a vibration signal from among a plurality of vibration signals listed in a reference database;
a verifying step, implemented by a verifying module, comprising verifying whether the at least one signal preserved in the filtering step corresponds to at least one signal listed in the reference database, the at least one signal listed in the reference database being representative of a set of flight conditions of the aircraft;

a step, implemented by an identifying module, of identifying whether the at least one signal preserved in the filtering step does not correspond to at least one signal representative of a set of flight conditions of the aircraft among the at least one signal listed in the reference database, comprising identifying one or more sources of vibration corresponding to the at least one signal preserved in the filtering step;

a maneuver-requesting step, implemented by a maneuver-requesting module, comprising requesting an operator to carry out at least one maneuver with the aircraft, the at least one requested maneuver depending on the one or more identified sources of vibration;

a deciding step, implemented by a deciding module, comprising deciding, using a predefined decision tree, whether the group of steps should be implemented again based on carrying out of the at least one requested maneuver and whether the vibration is affected by the at least one requested maneuver; and a transmitting step, implemented by a transmitting module, comprising transmitting, to a user device, a report representative at least of the one or more identified sources and of the at least one maneuver carried out by the operator.

2. The method according to claim 1, wherein the filtering step comprises the following substeps for the at least one sensor:

a first filtering substep, implemented by a first filtering submodule, comprising filtering the at least one signal measured by the at least one sensor to remove components of the at least one signal corresponding to vibrations having a vibration frequency outside a frequency band characteristic of one or more portions of the aircraft in which the at least one sensor is located;

a second filtering substep, implemented by a second filtering submodule, comprising filtering the at least one signal filtered in the first filtering substep to preserve components of the at least one signal corresponding to vibrations having a vibration amplitude greater than an amplitude threshold characteristic of the one or more portions in which the at least one sensor is located, the vibrations having an amplitude greater than a characteristic amplitude threshold for a time longer than a characteristic time of the one or more portions in which the at least one sensor is located.

3. The method according to claim 2, wherein the second filtering substep comprises the following sub steps:

an envelope-determining substep, implemented by an envelope-determining submodule, comprising determining an envelope for the at least one signal filtered in the first filtering substep, a detecting substep, implemented by a detecting submodule, comprising detecting one or more peaks of the envelope having an amplitude greater than a characteristic amplitude threshold for a time longer than a characteristic time of the one or more portions in which the at least one sensor is located;

components of the at least one preserved signal corresponding to vibrations comprised in one or more peaks of the envelope detected in the detecting substep.

4. The method according to claim 1, further comprising an inputting step, implemented by an inputting module, comprising inputting current flight parameters and current flight conditions, the verifying step furthermore comprising verifying whether the at least one signal preserved in the filtering step corresponds to a signal characteristic of a current flight phase based on the current flight parameters and the current flight conditions, the identifying step and the maneuver-requesting step being implemented furthermore if the at least one signal preserved in the filtering step does not correspond to at least one signal characteristic of the current flight phase.

5. The method according to claim 4, wherein the inputting step comprises a collecting substep, implemented by a collecting submodule, comprising collecting, via an input keyboard, at least some of the current flight parameters and flight conditions.

6. The method according to claim 4, wherein the inputting step comprises a capturing substep, implemented by a capturing module, comprising capturing at least one voice sequence produced by an operator, the at least one voice sequence corresponding to at least some of the current flight parameters and flight conditions.

7. The method according to claim 1, wherein the user device corresponds to a data lake.

8. A system for assisting with the identification of vibration on board an aircraft, comprising the following group of modules:

a collecting module configured to collect at least one vibration-representative signal, the at least one signal being measured by at least one sensor on board the aircraft;

a filtering module configured to filter the at least one vibration-representative signal with a view to preserving the signal that exhibits a vibration signature listed in a reference database;

a verifying module configured to verify whether the at least one signal preserved by the filtering module corresponds to at least one signal among a plurality of signals listed in the reference database, each of the signals listed in the reference database being representative of a set of flight conditions of the aircraft;

an identifying module configured to identify one or more sources of vibration corresponding to the at least one signal preserved by the filtering module, based on the reference database, if the at least one signal preserved by the filtering module does not correspond to at least one signal representative of a set of flight conditions of the aircraft among said signals listed in the reference database;

a maneuver-requesting module configured to request an operator to carry out at least one maneuver with the aircraft, the at least one requested maneuver depending on the one or more identified sources of vibration;

a deciding module configured to decide, using a predefined decision tree, whether the group of modules should be implemented again based on carrying out of the at least one requested maneuver and whether the vibration is affected by the at least one requested maneuver;

a transmitting module configured to transmit, to a user device, a report representative at least of the one or more identified sources and of the at least one maneuver carried out by the operator.

9. The system according to claim 8, wherein the filtering module comprises:

a first filtering submodule configured to filter the at least one signal measured by the at least one sensor to remove components of the at least one signal corresponding to vibrations having a vibration frequency outside a frequency band characteristic of one or more portions of the aircraft in which the at least one sensor is located;

a second filtering submodule configured to filter the at least one signal filtered by the first filtering submodule to preserve components of the at least one signal corresponding to vibrations having a vibration amplitude greater than an amplitude threshold characteristic of the one or more portions in which the at least one sensor is located, the vibrations having an amplitude greater than the amplitude threshold characteristic for a time longer than a characteristic time of the one or more portions in which the at least one sensor is located.

10. The system according to claim 9, wherein the second filtering submodule comprises:

an envelope-determining submodule configured to determine an envelope for the at least one signal filtered by the first filtering submodule, a detecting submodule configured to detect one or more peaks of the envelope having an amplitude greater than the characteristic amplitude threshold for a time longer than a characteristic time of the one or more portions in which the at least one sensor is located, the components of the at least one preserved signals corresponding to vibrations comprised in one or more peaks of the envelope detected by the detecting submodule.

11. The system according to claim 8, further comprising:

an inputting module configured to input current flight parameters and current flight conditions, the verifying module furthermore being configured to verify whether the at least one signal preserved by the filtering module corresponds to at least one signal characteristic of a current flight phase based on the current flight parameters and the current flight conditions, the identifying module and the maneuver-requesting module being implemented furthermore if the at least one signal preserved by the filtering module does not correspond to at least one signal characteristic of the current flight phase.

12. The system according to claim 11, wherein the inputting module comprises a collecting submodule configured to collect, via an input keyboard, at least some of the current flight parameters and flight conditions.

13. The system according to claim 11, wherein the inputting module comprises a capturing module configured to capture at least one voice sequence produced by an operator, the at least one voice sequence corresponding to at least some of the flight parameters and current flight conditions.

14. An aircraft comprising a system for assisting with the identification of vibration such as specified in claim 8.

* * * * *